(12) United States Patent
Schneider (10) Patent No.: US 8,775,457 B2
(45) Date of Patent: Jul. 8, 2014

(54) EFFICIENT STRING MATCHING STATE MACHINE

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 514 days.

(21) Appl. No.: 12/790,961

(22) Filed: May 31, 2010

(65) Prior Publication Data

US 2011/0295869 A1 Dec. 1, 2011

(51) Int. Cl.
*G06F 17/30* (2006.01)

(52) U.S. Cl.
USPC .......................................... 707/758; 707/798

(58) Field of Classification Search
USPC ........................................ 707/780, 758, 798
See application file for complete search history.

(56) References Cited

U.S. PATENT DOCUMENTS

| | | | | |
|---|---|---|---|---|
| 5,485,373 | A | * | 1/1996 | Davis et al. .................... 715/205 |
| 7,877,401 | B1 | * | 1/2011 | Hostetter et al. ............... 707/758 |
| 2007/0006293 | A1 | * | 1/2007 | Balakrishnan et al. ......... 726/13 |

OTHER PUBLICATIONS

R.A. Baeza-Yates et al., "On Boyer-Moore Automata", Algorithmica, vol. 12. (1994), pp. 268-292.*
Gonzalo Navarro & Mathieu Raffinot, "A Bit-Parallel Approach to Suffix Automata: Fast Extended String Matching", ACM CPM '98, 1998, pp. 14-33.*
A-Ning Du et al., "Comparison of Stringmatching Algorithms: An Aid to Information Content Security", 2003 IEEE Conference on Machine Learning and Cybernetics, pp. 2996-3001.*
M. Crochemore et al., "Speeding Up Two String-Matching Algorithms", Springer-Verlag New York, Inc., Algorithmica (1994), 12:247-267.*
Kuo-Kun Tseng et al., "A Parallel Automaton String Matching with Pre-Hashing and Root-Indexing Techniques for Content Filtering Coprocessor", IEEE ASAP'05 (2005).*
Ying Liu et al., "Real-Time Data Pre-Processing Technique for Efficient Feature Extraction in Large Scale Datasets", ACM CIKM'08 (Oct. 2008), pp. 981-990.*

* cited by examiner

*Primary Examiner* — Rehana Perveen
*Assistant Examiner* — Scott A Waldron
(74) *Attorney, Agent, or Firm* — Lowenstein Sandler LLP (57) ABSTRACT

An apparatus and a method for searching one or more documents for several different strings is described. A finite state machine receives and processes one or more search strings with a tail-first search. A matching string machine forms states based on the characters in the search string with at least one state accepting a match. The states are annotated with a pattern that indicates what the state has matched and can match. Each position within the pattern is either a character that has been matched at that point or an indicator that it is unknown.

17 Claims, 7 Drawing Sheets

FIG. 2B

| CHARACTER | SHIFT | NEXT STATE |
|---|---|---|
| a | 3 | ..a... |
| b | 2 | .b.... |
| c | 4 | ...c.. |
| e | -1 | .e.... |
| h | 3 | ..h... |
| i | 4 | ...i.. |
| k | -1 | .k.... |
| l | 1 | ..l... |
| m | 4 | ...m.. |
| o | 4 | ....o. |
| p | 4 | ....p. |
| q | 4 | ....q |
| s | 1 | ...s. |
| u | 2 | ..u.. |
| w | 3 | w.... |

FIG. 3

| CHARACTER | SHIFT | NEXT STATE |
|---|---|---|
| a | 1 | .a... |
| c | 2 | c.... |
| d | 3 | d.... |
| o | 1 | ..o.. |
| r | 3 | ..... |
| t | -1 | .t... |
| . | 3 | ..... |

FIG. 4

| CHARACTER | SHIFT | NEXT STATE |
|---|---|---|
| a | 3 | ..: |
| c | 2 | c..: |
| d | 3 | d..: |
| o | 3 | ..: |
| r | 3 | ..: |
| t | -2 | .at |
| . | 3 | ..: |

FIG. 5

| CHARACTER | SHIFT | NEXT STATE |
|---|---|---|
| a | 1 | .a.: |
| c | 2 | c..: |
| d | 3 | d..: |
| o | 2 | .o.: |
| r | 3 | ..: |
| t | -1 | c.t |
| . | 3 | ..: |

FIG. 6

| CHARACTER | SHIFT | NEXT STATE |
|---|---|---|
| a | 1 | .a._ |
| c | 2 | c._ |
| d | 3 | d.._ |
| o | 1 | ..o._ |
| r | -1 | d..r |
| t | -1 | ..t |
| . | 3 | .._ |

FIG. 7

| CHARACTER | SHIFT | NEXT STATE |
|---|---|---|
| a | 3 | ..._ |
| c | 2 | c._ |
| d | 3 | d.._ |
| o | 1 | .oo._ |
| r | -2 | ..or |
| t | 3 | ..._ |
| . | 3 | ..._ |

FIG. 8

| CHARACTER | SHIFT | NEXT STATE |
|---|---|---|
| a | 1 | .a. |
| c | 2 | c.. |
| d | 3 | d... |
| o | 2 | .o.. |
| r | -1 | .o.r |
| t | 3 | ... |
| . | 3 | ... |

*FIG. 10*

| CHARACTER | SHIFT | NEXT STATE |
|---|---|---|
| a | -1 | .at |
| c | 4 | ... |
| d | 4 | ... |
| o | 4 | ... |
| r | 4 | ... |
| t | 4 | ... |
| . | 4 | ... |

*FIG. 9*

| CHARACTER | SHIFT | NEXT STATE |
|---|---|---|
| a | 3 | ...⎯ |
| c | 2 | c..⎯ |
| d | 3 | d...⎯ |
| o | 3 | ..⎯ |
| r | -3 | .oor⎯ |
| t | 3 | ..⎯ |
| . | 3 | ..⎯ |

FIG. 11

EFFICIENT STRING MATCHING STATE MACHINE

TECHNICAL FIELD

Embodiments of the present invention relate to computing systems, and more particularly, to a process for searching documents.

BACKGROUND

Searching one or more documents for several different strings may be performed using different kinds of algorithm, such as Boyer-Moore. Examples of search constraints can include the following constraints:

The strings are fixed, but of differing lengths.

The matcher runs the search in a streaming environment. So it needs to match without buffering large amounts of data.

The matcher has to be efficient by examining as few characters as possible, and copying as few characters into buffers as possible.

A prior solution involves the Boyer-Moore algorithm. However, this algorithm can only be applied when matching a single search string and not several strings. If the strings were all the same size, a rolling hash algorithm could be used. Regular expression matching algorithm would also work too. But the matching operation tends to be slow with the above constraints.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for searching a set of documents for several different strings. A finite state machine receives and processes a search string with a tail-first search. A matching string machine forms states based on the characters strings in the search string with at least one state accepting a match. The states are annotated with a pattern that indicates what the state has matched and can match. Each position within the pattern is either a character that has been matched at that point or an indicator that it is unknown.

Figure 1:
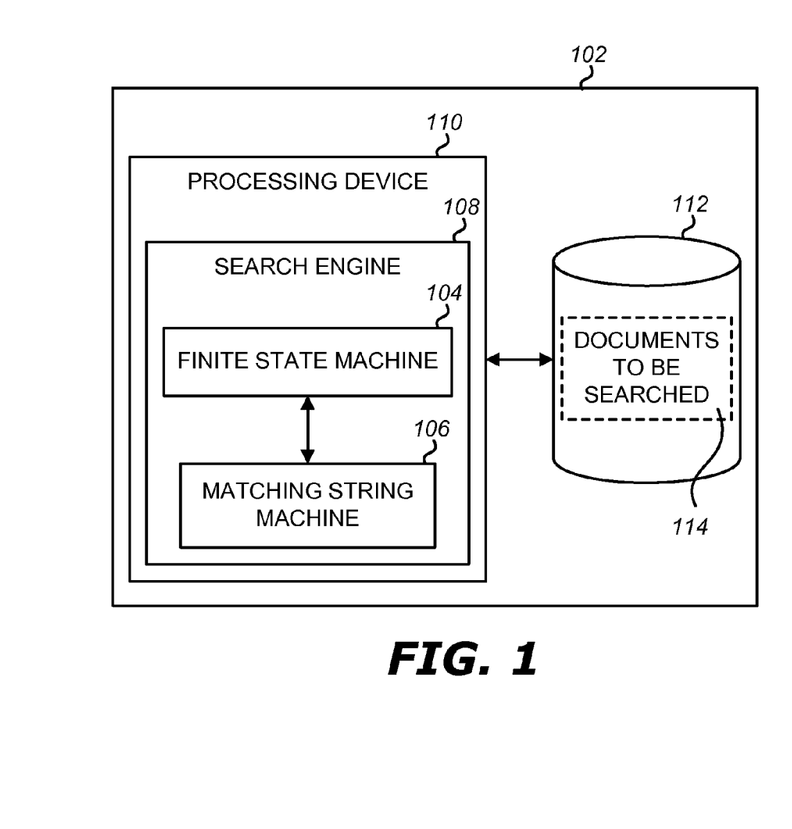
FIG. 1 is a block diagram illustrating one embodiment of a system for searching documents for several different strings.

FIG. 1 is a block diagram illustrating one embodiment of a computer system 102 for searching a set of documents for several different strings. Computer system 102 comprises a processing device 110 accessing data from a storage device 112. Processing device 110 comprises a search engine configured to search documents/data 114 stored in storage device 112. In one embodiment, documents 114 comprise text documents. Search engine 108 comprises a finite state machine 104 and a matching string machine 106. The finite state machine 104 is configured to receive and process the search string with a tail-first algorithm. The matching string machine 106 is configured to form states from the character strings. The operations of finite state machine 104 and matching string machine 106 are further described below.

Processing device 110 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 110 may also be one or more special-purpose processing devices such as an application specific integrated circuit (ASIC), a field programmable gate array (FPGA), a digital signal processor (DSP), network processor, or the like.

Storage device 112 can include a memory or a data storage device. Memory can include a read-only memory (ROM), flash memory, dynamic random access memory (DRAM) such as synchronous DRAM (SDRAM), or a static memory (e.g., flash memory, static random access memory (SRAM), etc.). Data storage device may include a computer-accessible storage medium on which is stored one or more sets of instructions embodying any one or more of the methodologies or functions described herein.

The finite state machine 104 and matching string machine 106 may also reside, completely or at least partially, within a main memory and/or within the processing device 110 during execution thereof by the computer system 102, the main memory and the processing device 110 also constituting computer-accessible storage media. The software may further be transmitted or received over a network via the network interface device.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

Figure 2A:
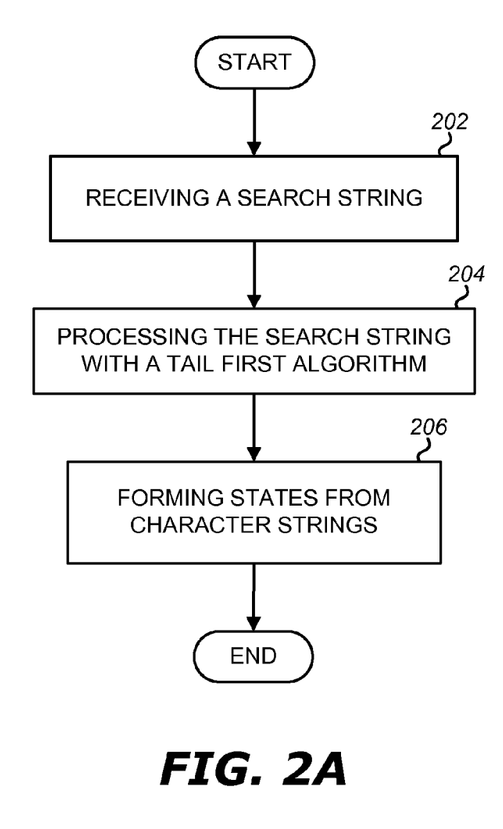
FIG. 2A is a flow diagram illustrating one embodiment of a method for matching search strings.

FIG. 2A is a flow diagram illustrating a method for matching search strings. In one embodiment, the tail-first search aspect of Boyer-Moore algorithm is combined with a finite state machine 104 to arrive at a matching string machine 106 for each set of strings to be matched. At 202, a search string is received. At 204, the search string is processed with a tail-first search with finite state machine 104. For example, the search string is searched to match from its end using a Boyer-Moore algorithm. In the Boyer-Moore algorithm, a single string to be matched is processed to form two so-called "shift" tables. The shift tables get their name from the fact that they cause the matcher to shift the point at which it is matching the string. Thus, Boyer-Moore algorithm searches a string by attempting to match the given match string from its end. For example, looking for the string "echo" within a search space would begin by looking at the fourth character in the search string:

not_an echo chamber
ech<u>o</u>

In the example above, the match function is examining the search space (the first string) at the underlined location. It is attempting to match against the last character in the search string (the second string), shown as bold and underlined. In this case, as there is no space character in the search string, the match function is able to skip the first four characters of the search space without examining the other three characters.

At 206, states are formed based on the characters in the search string with at least one state accepting a match with matching string machine 106. The states are annotated with a pattern that indicates what the state has matched and can match, each position within the pattern is either a character that has been matched at that point or an indicator that it is unknown.

Figure 2B:
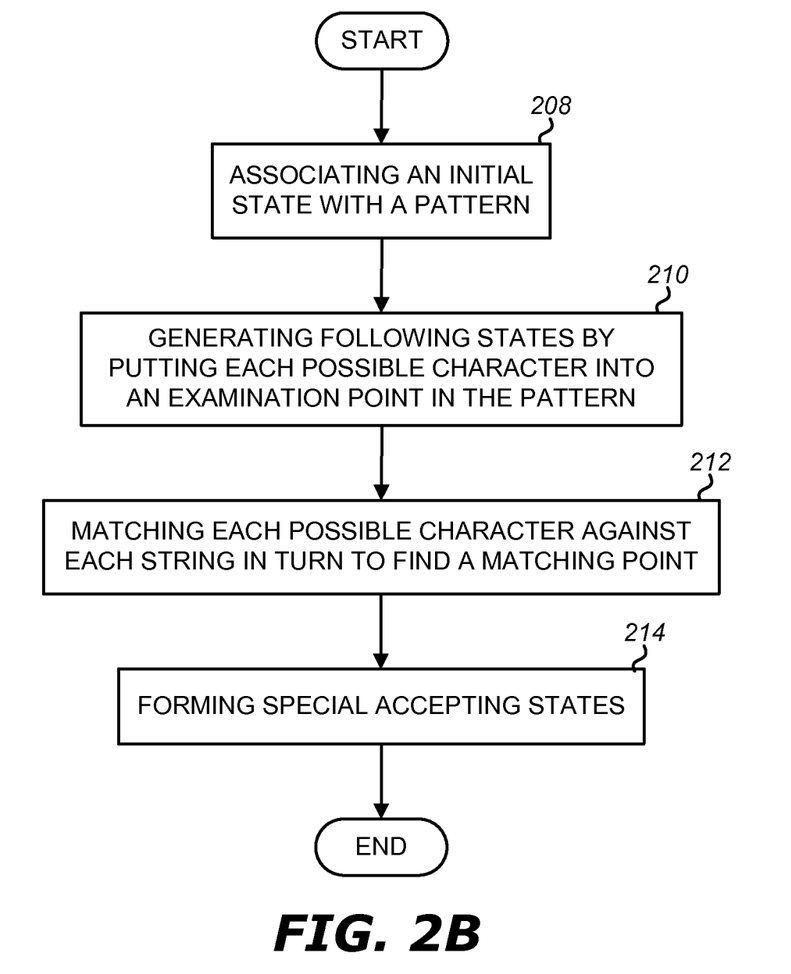
FIG. 2B is a flow diagram illustrating one embodiment of a method for forming states from character strings.

FIG. 2B is a flow diagram illustrating one embodiment of a method for forming states from character strings. At 208, each annotation pattern is associated with a pointer to where the matching string machine matches within the pattern, each pattern followed by a predefined number of characters defined as unknown. The states are formed by associating an initial state with a pattern. At 210, following states are generated by putting each possible character into an examination point in the pattern. At 212, each possible character is matched against each string in turn to find a match point. At 214, special accepting states are formed with one special accepting state for each string to be matched. A shift value moves the match pointer to the starting offset of the string.

In another embodiment, states are created based on characters as they are seen, with several states accepting a particular match. The states can be considered to be annotated with a pattern that indicates what the state has matched and can match. Each position within the pattern is either a character (or set of equivalent characters) that has been matched at that point, or a "don't know" indication. For instance, the initial state can match any string the same length as the shortest string in the collection. Each annotation pattern is associated with a pointer to where the state machine would be matching within the pattern. Each pattern can also be considered to be followed by an arbitrary number of following "don't know" characters. The first character in the pattern is implicitly the first point at which the first character of a match string can occur.

For a concrete example, consider the following words:
able
cause
common
complete
measure
question
science
whole
work This is a set of nine words taken from the five hundred most common words in the English language, chosen to provide words of differing lengths, and some common first letters. For illustrative purposes, annotation patterns are created using the dot ('.') symbol to indicate that the character at that point within the pattern is unknown.

The characters within this set of 9 words are:
a b c e h i k l m n o p q r s t u w The initial state is associated with the pattern . . . <u>.</u>, where the character to be examined is bolded and underlined. To generate following states, the state machine generator puts each possible character into the examination point in the pattern, and matches it against each string in turn to find a match point. First, though, the "default" transition is created. If the matcher encounters a character not in any of the strings to be matched, it can skip forward four characters and start over.

To create states for characters that actually occur within the strings, starting with the first character ('a'), the following are possible matches:

```
...a
  able
 cause
    common
    complete
 measure
    question
    science
    whole
    work
```

In order to align the 'a' character, the state machine would need to shift the earliest start character by 3, 2, 4, 4, 1, 4, 4, 4, and 4, respectively. After each of these shifts, the end point of the corresponding string is 3, 3, 6, 8, 4, 8, 6, 5, and 4 characters from the current match point, respectively. The state machine generator takes the smallest of each of these values to create the following state. First, as the shortest end point after matching is 3, the current pattern (after inserting the matched character "a") is extended by that many "don't know" indicators, making it . . . a . . . . Second, the shortest shift of 1 would remove the first character from the match pattern, making it . . a . . . . Finally, the examination point would be moved to the last unknown character within the pattern, which requires a shift of the examination point forward by 3, giving this annotation pattern for the following state: . . a . . . <u>.</u> So, from the initial state, if the matcher sees an "a" character, it shifts the examination point forward by 3 and transitions to the state annotated by the pattern just derived.

Continuing with the letter "b", all but the first search string results in a shift of four to align the pattern. The first string requires a shift of 2, and will have two characters following the matched character. The resulting pattern is . b . . . So, upon matching the character "b", the matcher shifts the examination point by 2, and transitions to the state annotated with the pattern just derived.

For the character "c", the following matches are possible:

```
...c
  able
 cause
 common
 complete
    measure
    question
 science
    whole
    work
```

The shifts are 4, 3, 3, 3, 4, 4, 2, 4, and 4, respectively, with end points at 4, 4, 5, 7, 7, 8, 5, 5, and 4, respectively. The smallest initial shift is 2, and the smallest end point shift is 4, so the pattern generated is . c . . . .., so the initial state would shift the match pointer forward by 4, and enter the state annotated by the pattern just generated, upon matching a "c".

At the letter "e", something is interesting:

```
...e
abl e
   cause
   common
   complete
   me a sure
   qu e stion
sci e nce
   whole
   work
```

Note that the word "cause" is completely shifted—this is because there is no possible way to match the "e" in character position 5, if there are only four characters in the string being searched.

The other interesting point is that neither "able" nor "science" need to be shifted at all to line up. The shortest shift, and the shortest number of characters to move forward to line up the end of the string, are both zero. The pattern becomes . . . e, with the search pointer moved back by 1. So, the matcher moves its search pointer back one, and transitions to the state annotated by the generated pattern, when an "e" is encountered at the match point.

Continuing, the character "h" results in a shift of 3, with a target state annotated by the pattern . h . . ., "i" results in a shift of 4, with a target state annotation pattern of . . i . . . ., "k" results in a shift of –1, with a target state annotation of . . . k, "l" results in a shift of 1, with a target state annotation of . . . l ., "m" results in a shift of 4, with a target state annotation of . . m . . . ., "o" results in a shift of 4, with a target pattern of . . o . . . ., "p", a shift of 4, with a target pattern of . . . p . . . ., "q", a shift of 4, with a target pattern of q . . . ., "s", a shift of 1, with a target pattern of . . . . s ., "u", a shift of 2, target of . . u . ., and "w", a shift of 3, target of w . . . . Note that neither "n", "r", nor "t" result in a new state, since none of these characters occur within the first four characters of any string being matched.

Figure 3:
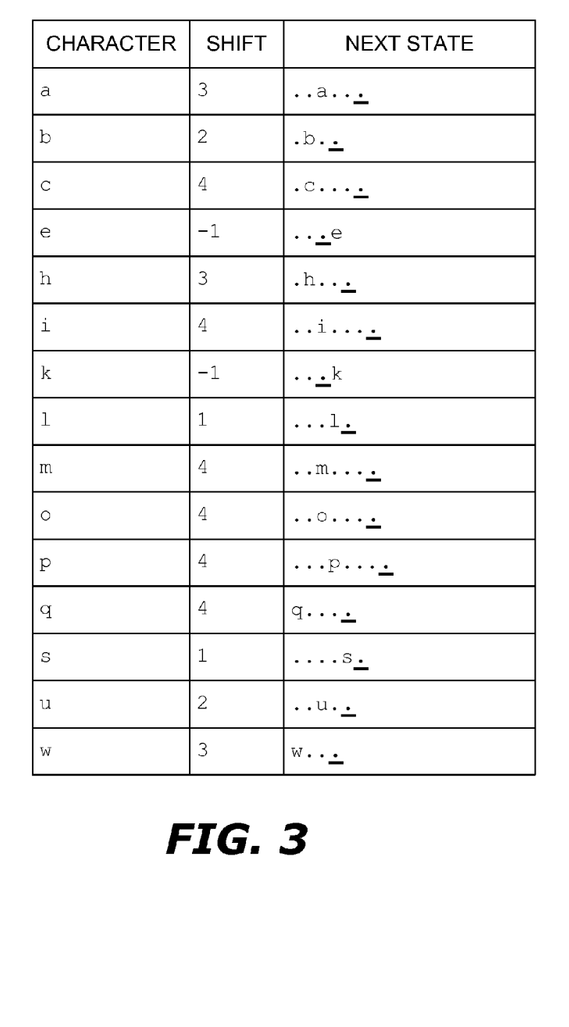
FIG. 3 is a table illustrating one example of an initial state.
Figure 4:
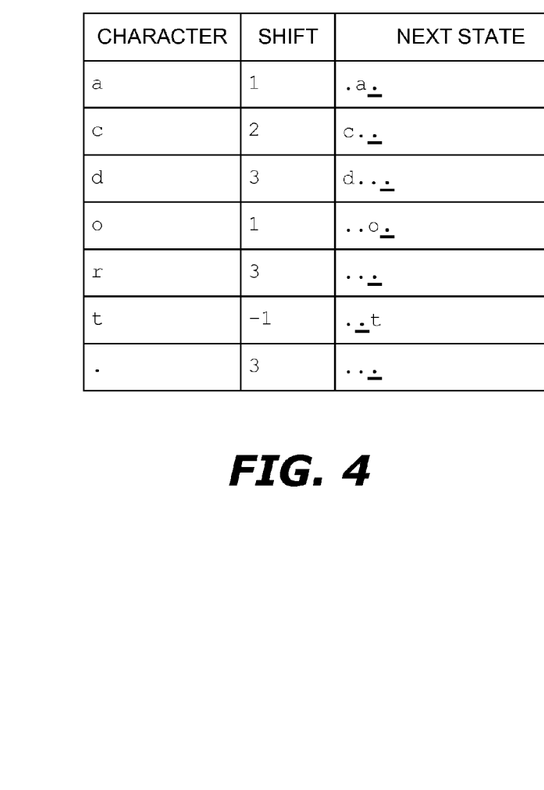
FIG. 4 is a table illustrating a first iteration of the state of FIG. 3.

From the initial state, matching string machine 106 forms the state transitions as illustrated in FIG. 3.

At this point, the state creator has 15 patterns for new states. It would iterate through each of these states, adding new patterns as required to the list of patterns to process to generate new states. For instance, the first state from the table above comes from the pattern . . a . . . . Iterating through the characters starting with "a", we get:

```
..a..a
   able
   c a use
   common
   complete
   me a sure
      question
      science
      whole
      work
```

The pattern resulting from this would be identical to the original pattern of . . a . . . . Therefore, the appropriate operation is to shift 3, and return to the same state.

The character "b" in this state gives:

```
..a..b
   ab le
      cause
      common
      complete
      measure
      question
      science
      whole
      work
```

This would cause the same shift and transition as would be the case from the initial state.

Each of the patterns is processed in this manner, and removed from the list of patterns to be processed. New patterns with any unknown characters are added to the list of patterns to be processed. New patterns without unknown characters signify accepting states, and are not added to the list of patterns to process. For example, consider the state annotated by the pattern . ork. On matching the character "w" from this state, the state machine can accept "work". The state machine can either transition to a special "accepting" state, or this can be accounted for within the state machine by using a special case.

It is not necessary to keep the annotation patterns around once the state machine has been constructed. Their entire function is to encode the information available to the state machine at the state with which they are associated. Once the state machine is completely constructed, the information is implicit within the transitions between states.

Since every transition to a new (non-accepting) state is accompanied by a shift of the match pointer, using a shift value of zero can signal that the state machine should accept the string. The offset from the match pointer to the start of the string and the index of the string within the set of strings being matched can be encoded using an integer smaller than the product of the number of strings times the length of the longest string, using a mixed radix representation.

In another embodiment, the state machine could have special accepting states (one for each string to be matched), and the shift value would move the match pointer to the starting offset of the string.

Using the first approach, the strings from the example can be matched with a state machine that uses 206 states—the information required to locate the string within the search space from a particular accepting state can be encoded in an integer in the range 0-71.

Using the second approach, the strings can be matched using 215 states.

In either case, the state machine can be encoded using integers that will fit within octets, considered as signed or unsigned values, as appropriate. If the characters to be matched can be filtered (assigning small integers to the values in the set of characters that occur within the strings, and another integer for the case where the character doesn't occur in any string to be matched), each state would require 38 octets to represent (one per character for the shift value, one per character for the next state, times 18 characters plus one "don't care"). The entire state machine would take 7,828 or 8,170 octets to represent, depending on which approach is taken to encode the accepting states.

In another embodiment, the state machine could use tables that are large enough to accommodate any character encountered (for instance, using transition and shift tables with 256 entries each for a character set that can span the range 0-255). Using this construction, and limiting the search space character set to the range 0-255 (or, equivalently, doing a binary search on octets), each state would use 512 octets, for a total of 105,472 or 110,080 octets (103K or 107.5K, depending).

The enormous size of these tables can only be justified if the matcher will be heavily used in time-critical operations. But, if they are used, the operation at each character consists of two table lookups, a comparison with zero, and an addition.

The following is another example to further illustrate the present string matching state machine:

Strings to match:
cat
door

Characters in the strings: a c d o r t
Initial state: . . .
Considering each character in turn:

```
         . . a
          cat
           door
         . . c
          cat
           door
         . . d
          cat
          door
         . . o
          cat
         door
         . . r
          cat
           door
         . . t
         cat
           door
```

Figure 5:
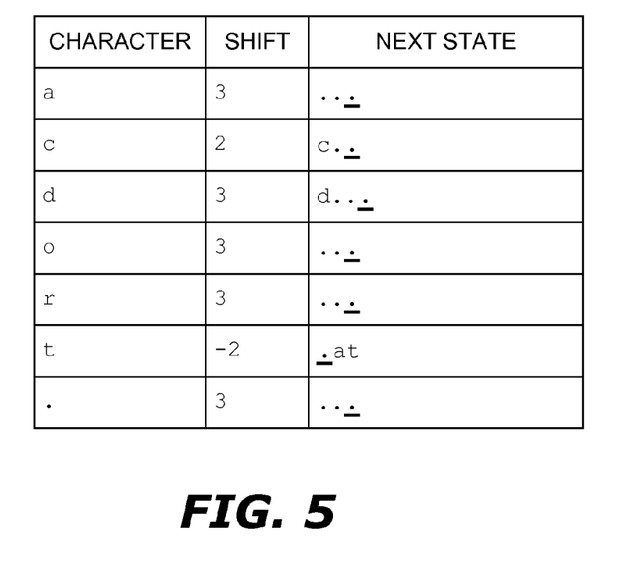
FIG. 5 is a table illustrating a second iteration of the state of FIG. 3.

From these, FIG. 5 illustrates a constructed state transition table based on the above. This leads to five new state annotations: . a . ., c . ., d . . ., . . o ., and . . t.

Beginning with the first new state:

```
         . aa
           cat
            door
         . ac
           cat
            door
         . ad
           door
           cat
         . ao
           cat
            door
         . ar
           cat
            door
         . at
          cat
            door
```

Figure 6:
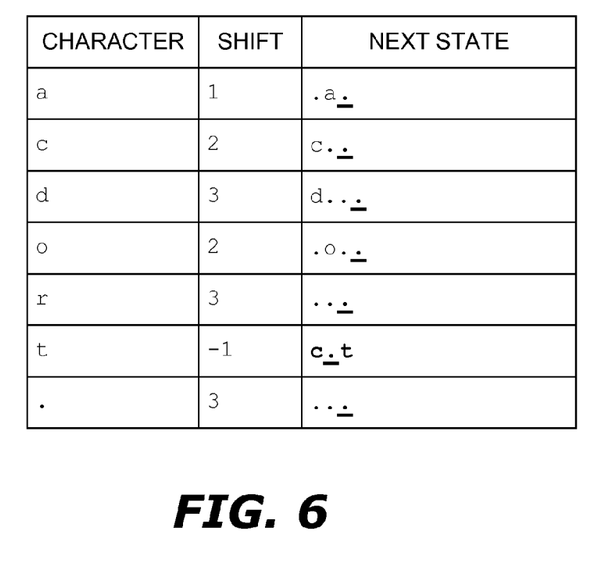
FIG. 6 is a table illustrating a third iteration of the state of FIG. 3.

From these, the built state transitions for . a . is illustrated in FIG. 6:

The only new state is . at. Annotating c . .:

```
          c . a
           cat
            door
          c . c
           cat
            door
          c . d
            cat
            door
```

```
          c . o
            cat
           door
          c . r
            cat
            door
          c . t
           cat
            door
```

Figure 7:
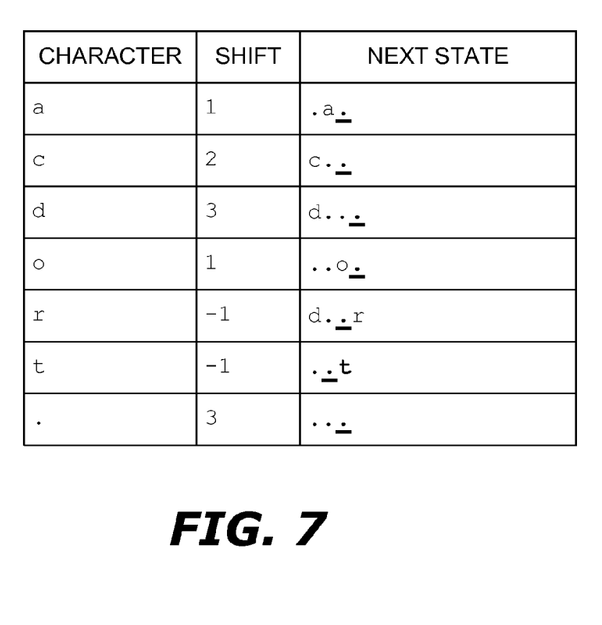
FIG. 7 is a table illustrating a fourth iteration of the state of FIG. 3.

From these, the state transitions for c . . can be constructed and is illustrated in FIG. 7. This gives us the new states . o . . and c . t . The next state to annotate is d . . .:

```
          d . . a
            cat
            door
          d . . c
            cat
            door
          d . . d
            cat
           door
          d . . o
            cat
           door
          d . . r
            cat
           door
          d . . t
           cat
            door
```

Figure 8:
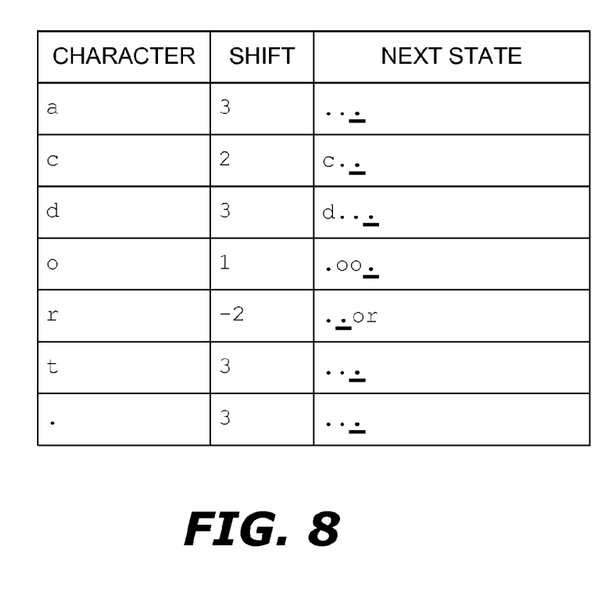
FIG. 8 is a table illustrating a fifth iteration of the state of FIG. 3.

From these, the following state transitions for d . . . is constructed and illustrated in FIG. 8. The only new state is d . . r. Annotating . . o .:

```
         . . oa
           cat
            door
         . . oc
           cat
            door
         . . od
           cat
           door
         . . oo
           cat
          door
         . . or
           cat
          door
         . . ot
           cat
            door
```

Figure 9:
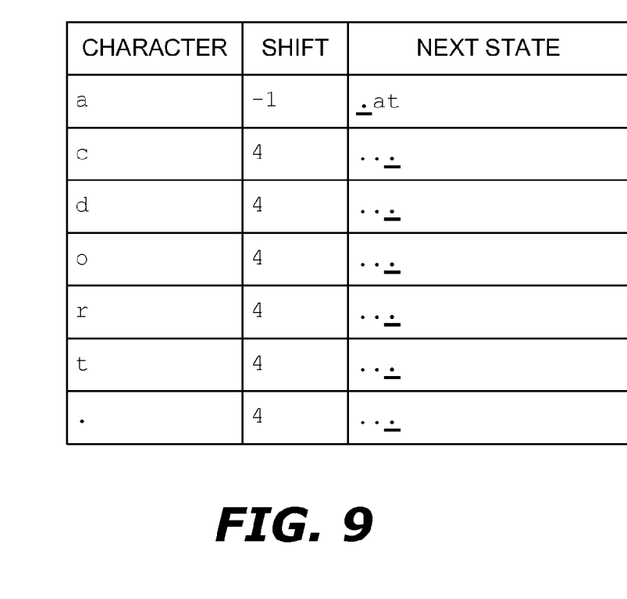
FIG. 9 is a table illustrating a sixth iteration of the state of FIG. 3.

From these, the following state transitions for . . o . is constructed and illustrated in FIG. 9. The states . oo . and . . or are new. The final state to annotate from the original set of generated states is . . t:

```
         . at
         cat
            door
         . ct
          cat
            door
         . dt
           cat
           door
```

-continued

```
.ot
    cat
    door
.rt
    cat
    door
.tt
    cat
    door
```

Figure 10:
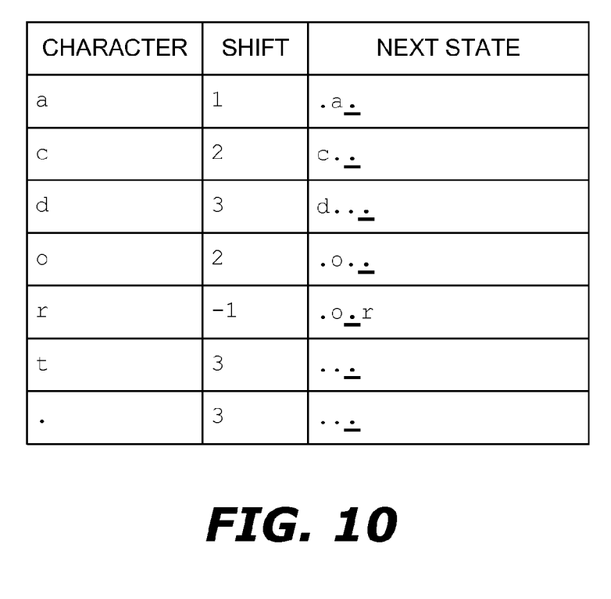
FIG. 10 is a table illustrating a seventh iteration of the state of FIG. 3.

From these, the following state transitions for . . t is constructed and illustrated in FIG. 10. There are no new states. The shifts for all of the characters except 'a' are 4—one to shift to the end of the current pattern, plus three to put the point of examination at the end of the new pattern.

The state annotations generated from the first generation of state annotations are:

```
.at
.o..
c.t
d..r
.oo.
..or
```

Annotating . at:

```
aat
    cat
    door
cat
cat
    door
dat
    cat
    door
oat
    cat
    door
rat
    cat
    door
tat
    cat
    door
```

As it is obvious that the state accepts "cat" on a c, and shifts forward 5, returning to the initial state, on everything else, the state transition table is skipped. Annotating

```
.o..:
.o.a
    cat
    door
.o.c
    cat
    door
.o.d
    cat
    door
.o.o
    cat
    door
.o.r
    cat
    door
.o.t
    cat
    door
```

Figure 11:
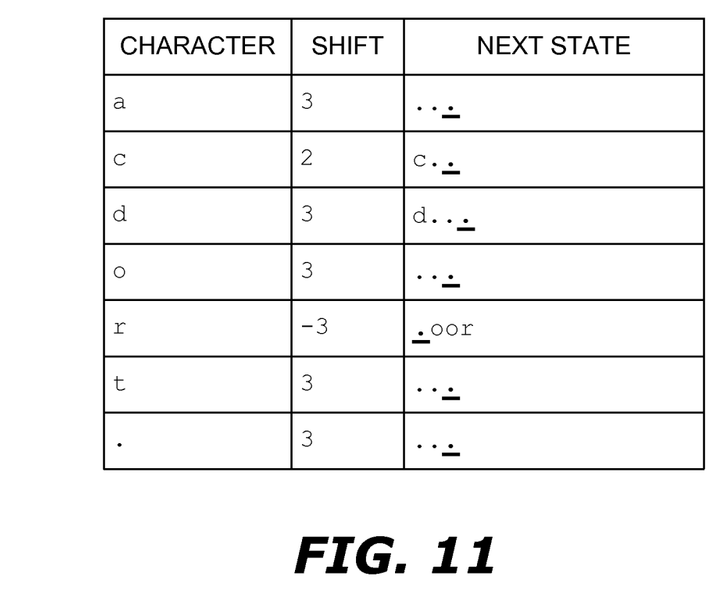
FIG. 11 is a table illustrating a eighth iteration of the state of FIG. 3.

From these, the following state transitions for . o . . is constructed and illustrated in FIG. 11:

The state . o . r is new. Annotating c . t leads to the pretty obvious result that the character 'a' accepts "cat", and everything else shifts by 4, going to the initial state. Annotating d . . r gives:

```
d.ar
    cat
    door
d.cr
    cat
    door
d.dr
    cat
    door
d.or
    cat
    door
d.rr
    cat
    door
d.tr
    cat
    door
```

For everything except 'o', this state shifts 4 and goes to the initial state. For 'o', it shifts minus one and goes to the state d . or, which is new.

Annotating . oo . :

```
.ooa
    cat
    door
.ooc
    cat
    door
.ood
    cat
    door
.ooo
    cat
    door
.oor
    cat
    door
.oot
    cat
    door
```

From these, the following state transitions for . oo . is constructed. The state annotation . oor is new. Annotating . . or:

```
.aor
    cat
    door
.cor
    cat
    door
.dor
    cat
    door
.oor
    cat
    door
.ror
    cat
    door
.tor
    cat
    door
```

The character 'o' gives a shift of −1 and a next state pattern of . oor. Everything else gives a shift of 5, and a return to the initial state.

The second generation of states gives rise to the following new patterns:

```
.o.r
d.or
.oor
```

The first of these will result in a shift of 4 and a return to the initial state for everything but the 'o' character, which will result in a shift of −2 and a transition to the state annotated by . oor. The second will accept "door" on seeing the character 'o', or shift 5 and go to the initial state. The third will accept "door" on seeing the character 'd', or shift 6 and go to the initial state on anything else.

The state machine has states annotated by the following patterns:

```
...
.a.
c..
d...
..o.
..t
.at
c.t
.o..
d..r
.oo.
..or
.o.r
d.or
.oor
```

The above example illustrates fifteen states.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving at least a first search string and a second search string, where a first length of the first search string is different than a second length of the second search string; and
constructing, by a computer system, a matching string machine comprising a plurality of states, wherein the constructing comprises:
processing the first search string and the second search string with a tail-first search,
associating an initial state of the matching string machine with a pattern,
putting each possible character into a point in the pattern,
matching each possible character against the first search string and the second search string to identify a match point, and
generating a state of the matching string machine in view of the match point;
wherein each of the plurality of states has a respective set of state transitions, and wherein each of the respective set of state transitions specifies a shift and a next state that are based on the first length, the second length, and characters of the first search string and the second search string, and wherein at least one of the plurality of states is an accepting state.

2. The method of claim 1 wherein the tail-first search comprises searching a string to match the first search string or the second search string from an end of the first search string or the second search string.

3. The method of claim 2 wherein a state of the matching string machine is annotated with a pattern that indicates what the state has matched and can match, and wherein each position within the pattern is either a character that has been matched at that point or an indicator that it is unknown.

4. The method of claim 3 wherein the pattern is associated with a pointer to where a finite state machine matches within the pattern, and wherein the pattern is followed by a number of characters defined as unknown.

5. The method of claim 1, wherein the constructing of the matching string machine further comprises: forming a first accepting state for the first search string and a second accepting state for the second search string.

6. The method of claim 1, wherein the matching string machine is encoded using tables of integers.

7. A non-transitory computer-readable storage medium, having instructions stored therein, which when executed, cause a computer system to perform operations comprising:
   receiving at least a first search string and a second search string, where a first length of the first search string is different than a second length of the second search string; and
   constructing, by a computer system, a matching string machine comprising a plurality of states, wherein the constructing comprises:
      processing the first search string and the second search string with a tail-first search,
      associating an initial state of the matching string machine with a pattern,
      putting each possible character into a point in the pattern,
      matching each possible character against the first search string and the second search string to identify a match point, and
      generating a state of the matching string machine in view of the match point;
   wherein each of the plurality of states has a respective set of state transitions, and wherein each of the respective set of state transitions specifies a shift and a next state that are based on the first length, the second length, and characters of the first search string and the second search string, and wherein at least one of the plurality of states is an accepting state.

8. The non-transitory computer-readable storage medium of claim 7 wherein the tail-first search comprises searching a string to match the first search string or the second search string from an end of the first search string or the second search string.

9. The non-transitory computer-readable storage medium of claim 8 wherein a state of the matching string machine is annotated with a pattern that indicates what the state has matched and can match, and wherein each position within the pattern is either a character that has been matched at that point or an indicator that it is unknown.

10. The non-transitory computer-readable storage medium of claim 9 wherein the pattern is associated with a pointer to where a finite state machine matches within the pattern, and wherein the pattern is followed by a number of characters defined as unknown.

11. The non-transitory computer-readable storage medium of claim 7, wherein the constructing of the matching string machine further comprises: forming a first accepting state for the first search string and a second accepting state for the second search string.

12. The non-transitory computer-readable storage medium of claim 7 wherein the matching string machine is encoded using tables of integers.

13. An apparatus comprising:
   a storage device to store documents to be searched, a table of characters, shifts, and states; and
   a processing device coupled to the storage device to:
      receive at least a first search string and a second search string, where a first length of the first search string is different than a second length of the second search string; and
      construct a matching string machine comprising a plurality of states, wherein the constructing comprises:
         processing the first search string and the second search string with a tail-first search,
         associating an initial state of the matching string machine with a pattern,
         putting each possible character into a point in the pattern,
         matching each possible character against the first search string and the second search string to identify a match point, and
         generating a state of the matching string machine in view of the match point;
      wherein each of the plurality of states has a respective set of state transitions, and wherein each of the respective set of state transitions specifies a shift and a next state that are based on the first length, the second length, and characters of the first search string and the second search string, and wherein at least one of the plurality of states is an accepting state.

14. The apparatus of claim 13 wherein the tail-first search comprises searching a string to match the first search string or the second search string from an end of the first search string or the second search string.

15. The apparatus of claim 14 wherein a state of the matching string machine is annotated with a pattern that indicates what the state has matched and can match, and wherein each position within the pattern is either a character that has been matched at that point or an indicator that it is unknown.

16. The apparatus of claim 15 wherein the pattern is associated with a pointer to where a finite state machine matches within the pattern, and wherein the pattern is followed by a number of characters defined as unknown.

17. The apparatus of claim 13, wherein the constructing of the matching string machine further comprises: forming a first accepting state for the first search string and a second accepting state for the second search string.

* * * * *